United States Patent
Cho et al.

(10) Patent No.: US 11,858,316 B2
(45) Date of Patent: *Jan. 2, 2024

(54) ROOF VENT

(71) Applicants: HYUNDAI MOTOR COMPANY, Seoul (KR); KIA MOTORS CORPORATION, Seoul (KR); NIFCO KOREA Inc., Anyang-si (KR); DAEHAN SOLUTION CO., LTD., Incheon (KR)

(72) Inventors: Min Ho Cho, Suwon-si (KR); Soon Kyu Lee, Incheon (KR); Woo Hyuk Kim, Asan-si (KR); Choong Ho Kwon, Seoul (KR); Geun Heung Kim, Asan-si (KR)

(73) Assignees: HYUNDAI MOTOR COMPANY, Seoul (KR); KIA MOTORS CORPORATION, Seoul (KR); NIFCO KOREA INC., Asan-si (KR); DAEHAN SOLUTION CO., LTD., Incheon (KR)

( * ) Notice: Subject to any disclaimer, the term of this patent is extended or adjusted under 35 U.S.C. 154(b) by 503 days.

This patent is subject to a terminal disclaimer.

(21) Appl. No.: 16/687,260

(22) Filed: Nov. 18, 2019

(65) Prior Publication Data
US 2020/0369124 A1  Nov. 26, 2020

(30) Foreign Application Priority Data
May 21, 2019  (KR) .................. 10-2019-0059182

(51) Int. Cl.
*B60H 1/34* (2006.01)
*B60H 1/24* (2006.01)
(Continued)

(52) U.S. Cl.
CPC ....... *B60H 1/3414* (2013.01); *B60H 1/00428* (2013.01); *B60H 1/00742* (2013.01);
(Continued)

(58) Field of Classification Search
CPC .............. B60H 1/3414; B60H 1/00428; B60H 1/00742; B60H 1/00864; B60H 1/245;
(Continued)

(56) References Cited

U.S. PATENT DOCUMENTS 4,143,556 A * 3/1979 Hauber ................... E05F 11/24
74/25
2005/0176364 A1 * 8/2005 Gehring ............... B60H 1/3428
454/155
(Continued)

FOREIGN PATENT DOCUMENTS

KR  20040003433 A  1/2004

*Primary Examiner* — Steven B McAllister
*Assistant Examiner* — Charles R Brawner
(74) *Attorney, Agent, or Firm* — LEMPIA SUMMERFIELD KATZ LLC

(57) ABSTRACT

A roof vent includes a roof disposed on a vehicle and a vent assembly. The vent assembly has at least one vent unit disposed on the roof and configured to enter the roof, a driving unit driving the vent unit, and at least one rack unit applying the driving force of the driving unit to the vent unit. The vent unit enters the roof due to operation of the driving unit.

9 Claims, 3 Drawing Sheets

(51) Int. Cl.
*B60H 1/00* (2006.01)
*B60H 1/26* (2006.01)

(52) U.S. Cl.
CPC ......... *B60H 1/00864* (2013.01); *B60H 1/245* (2013.01); *B60H 1/262* (2013.01); *B60H 2001/3471* (2013.01)

(58) Field of Classification Search
CPC ............ B60H 1/262; B60H 2001/3471; E05F 15/697; E05Y 2201/434; E05Y 2900/542
USPC .......................................................... 454/75
See application file for complete search history.

(56) References Cited

U.S. PATENT DOCUMENTS

2010/0181061 A1* 7/2010 Ozeki ................ B60H 1/00842
  165/41
2012/0276833 A1* 11/2012 Wittorf ................ B60H 1/3421
  454/155
2016/0355070 A1* 12/2016 Kuttner .................. B60H 1/244

* cited by examiner

ROOF VENT

CROSS-REFERENCE TO RELATED APPLICATION

This application claims under 35 U.S.C. § 119(a) the benefit of priority to Korean Patent Application No. 10-2019-0059182 filed on May 21, 2019, the entire contents of which are incorporated herein by reference.

BACKGROUND

(a) Technical Field

The present disclosure relates to a roof vent. More particularly, it relates to a roof vent that is configured to enter the interior of a vehicle in order to make the interior of a vehicle communicate with the outside, circulate or introduce air, and adjust an airflow direction in accordance with selection by a passenger.

(b) Background Art

In general, a vehicle is an apparatus that moves on land and is a representative means of transportation that is mainly used for people to travel.

A vehicle is provided with a passenger compartment (hereinafter referred to as an "interior of the vehicle") in which passengers ride. In general, the interior of the vehicle is designed to be hermetically sealed from the outside in order to provide a comfortable riding environment for passengers.

Therefore, it is necessary to appropriately ventilate the interior of the vehicle. A generally used ventilation method is to introduce external air into the interior of the vehicle while the vehicle is moving.

However, the amount of air flowing into the vehicle while the vehicle is moving is too small to sufficiently ventilate the interior of the vehicle, which may have a bad influence on the health of passengers in the case of long-duration travel.

Further, because air is not uniformly introduced into the entire interior of the vehicle, only passengers who are located near the roof vent may receive ventilated air.

The above information disclosed in this Background section is only to enhance understanding of the background of the disclosure. Therefore, the Background section may contain information that does not form the prior art that is already known in this country to a person of ordinary skill in the art.

SUMMARY OF THE DISCLOSURE

The present disclosure has been made in an effort to solve the above-described problems associated with the prior art. It is an object of the present disclosure to provide a roof vent capable of uniformly introducing air into the interior of a vehicle.

It is another object of the present disclosure to provide a roof vent capable of selectively realizing a popup or tilting operation in response to a passenger's request, thereby adjusting an airflow direction so that air also flows to a region distant from the roof vent.

It is a further object of the present disclosure to provide a roof vent capable of realizing a popup or tilting operation so that air flows to a selected position or to a selected passenger.

In one aspect, the present disclosure provides a roof vent including a roof disposed at an upper side of an interior of a vehicle and including a vent assembly. The vent assembly includes at least one vent unit configured to enter the roof, a driving unit applying driving force to the vent unit, and at least one rack unit applying driving force of the driving unit to the vent unit. The vent unit enters the roof due to operation of the driving unit.

In an embodiment, the roof vent may include a first rack unit to which driving force of the driving unit is applied, a second rack unit interlocking with the first rack unit, a first slot formed in the back surface of the vent unit to allow one end of the first rack unit to move to one end of the vent unit in a longitudinal direction thereof, and a second slot formed in the back surface of the vent unit to allow one end of the second rack unit to move to the opposite end of the vent unit in the longitudinal direction thereof. The vent unit may enter the roof due to operation of the first rack unit.

In another embodiment, the at least one vent unit may include a plurality of vent units. The vent assembly may further include a windless unit disposed between the vent units and the vent units and the windless unit may be arranged in a longitudinal direction of the vehicle.

In still another embodiment, the at least one vent unit may include a plurality of vent units. The vent assembly may further include a windless unit disposed between the vent units and the vent units and the windless unit may be formed symmetrically in a width direction of the vehicle.

In yet another embodiment, the roof vent may further include a link part formed on the back surface of the vent unit and a guide slot formed in the roof to guide movement of the link part when the vent unit enters the roof.

In still yet another embodiment, the guide slot may include a first guide and a second guide disposed so as to face the link part, and a stopper formed at the first guide. The vent unit may be tilted such that a depth of entry of one end of the link part that moves along the first guide is smaller than a depth of entry of the opposite end of the link part that moves along the second guide.

In a further embodiment, the roof vent may further include at least one fixing part disposed so as to be offset from the central axis in a longitudinal direction of the vent unit. When the vent unit enters the roof, the vent unit may be tilted in a width direction thereof with respect to the fixing part such that one side of the vent unit comes into contact with the fixing part.

In another further embodiment, the roof vent may further include a position sensor detecting a position of a passenger. The roof vent may also include a controller configured to control operation of the driving unit so as to realize an entry or tilting operation of the vent unit in accordance with the detected position of the passenger.

In still another further embodiment, one end of the first rack unit and one end of the second rack unit that face the vent unit may be formed in a circular shape. The one end of the first rack unit and the one end of the second rack unit may be respectively engaged with the first slot and the second slot.

In yet another further embodiment, the first slot and the second slot may be disposed in the longitudinal direction of the vent unit. The first rack unit and the second rack unit may extend along the vent unit in the longitudinal direction thereof.

In another aspect, the present disclosure provides a roof vent including a roof disposed at an upper side of an interior of a vehicle and including a vent assembly. The vent assembly includes at least one vent unit configured to enter the roof, a driving unit applying driving force to the vent unit, and a rack gear engaged with the driving unit to apply driving force of the driving unit to the vent unit. The vent unit enters the roof due to operation of the driving unit and the rack gear.

In an embodiment, the driving unit may include a rotary gear meshing with the rack gear.

Other aspects and embodiments of the disclosure are discussed hereinbelow.

It should be understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power such as, for example, vehicles that are both gasoline-powered and electric-powered.

The above and other features of the disclosure are discussed hereinbelow.

BRIEF DESCRIPTION OF THE DRAWINGS

The above and other features of the present disclosure are now described in detail with reference to certain embodiments thereof illustrated in the accompanying drawings, which are given hereinbelow by way of illustration only, and thus are not limitative of the present disclosure, and wherein.

Figure 1:
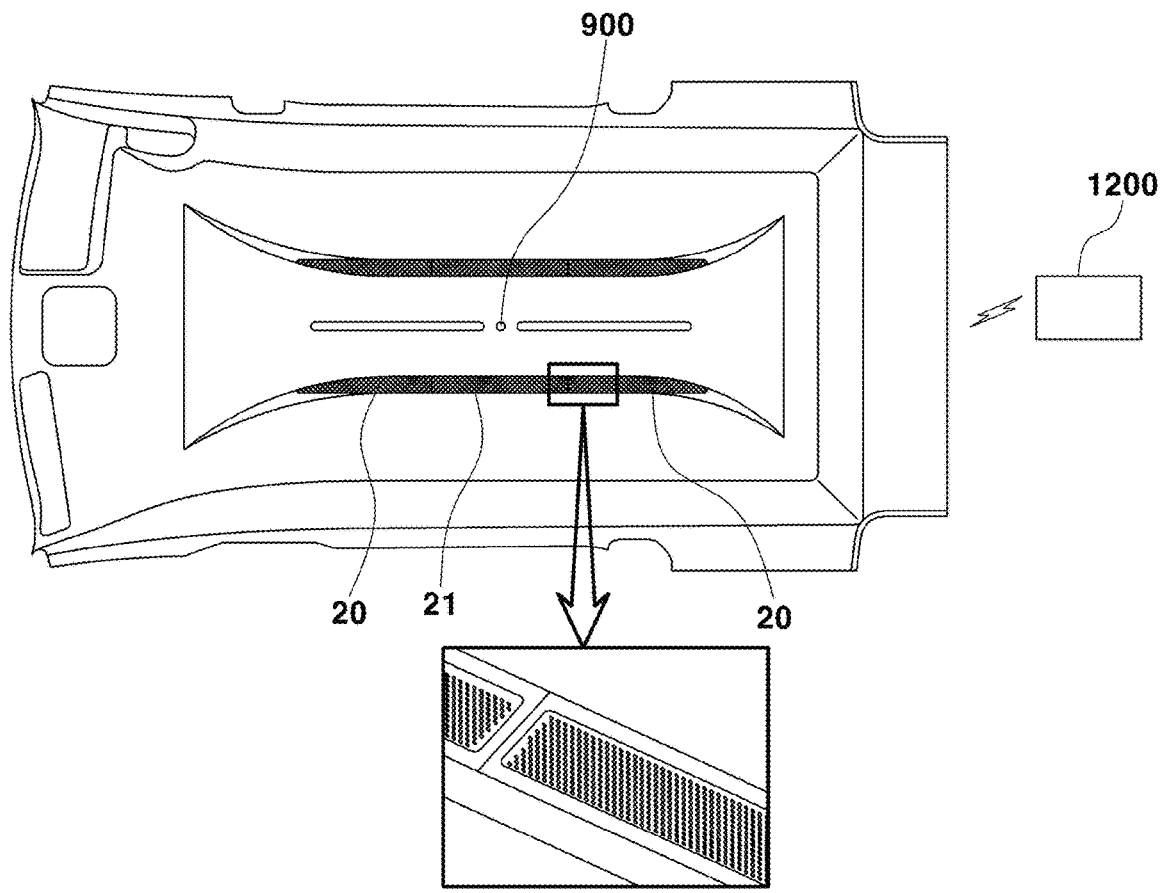
FIG. 1 is a plan view of a roof including a roof vent according to an embodiment of the disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

The present disclosure is described more fully with reference to the accompanying drawings, in which embodiments of the disclosure are shown. This disclosure may, however, be embodied in many different forms, and should not be construed as being limited to the embodiments set forth herein. Rather, these embodiments are provided so that this disclosure will be thorough and complete and will fully convey the scope of the disclosure to those having ordinary skill in the art.

The terms "part" and "assembly" used in the specification mean units for processing at least one function or operation, which can be implemented by hardware components, software components, or combinations thereof.

Further, it will be understood that terms such as "first" and "second" are only used to distinguish one element from another element. The essence, order, or sequence of corresponding elements are not limited by these terms.

The term "entry" used herein below means that a vent assembly is moved upwards into a roof while being maintained in a horizontal state, i.e. parallel to the roof, in the interior of the vehicle.

The term "tilting" used herein below means that a vent unit enters the roof of the vehicle such that the depth of entry of one end of the vent unit and the depth of entry of the opposite end of the vent unit are different from each other in a width direction of the vehicle, whereby a plate constituting the vent unit enters the roof so as to be tilted in the width direction of the vehicle. The present disclosure is not limited as to the specific upward inclination direction or upward inclination angle of the vent unit.

The roof vent according to the present disclosure is configured to distribute air throughout the interior of the vehicle in the state in which the vent unit enters the roof. The roof vent is configured to distribute air only in a selected region in the state in which the vent unit is tilted. However, the present disclosure is not limited as to the specific ventilation method.

FIG. 1 is a plan view of a roof of a vehicle including a vent device according to an embodiment of the disclosure.

As shown in the drawing, the roof vent of the present disclosure includes a roof 10 and a vent assembly 20.

At least one vent assembly 20 may be provided in the roof 10. According to the embodiment of the present disclosure, vent assemblies 20 may be disposed so as to be symmetrical to each other in a width direction of the vehicle. The vent assemblies 20 may be located at positions corresponding to a driver's seat and a front passenger seat and at positions corresponding to respective rear passenger seats.

In one embodiment of the present disclosure, the vent assemblies 20 may be formed so as to correspond to seats arranged in four rows and may include vent units that correspond to respective passengers.

An air-conditioning system (not shown) may be provided in the vehicle in order to heat or cool internal or external air and to introduce or circulate the heated or cooled air into or in the interior of the vehicle. This maintains the indoor temperature at an appropriate level and provides a comfortable riding environment for passengers.

The air-conditioning system may include a roof duct, which communicates with a pillar duct and discharges the air-conditioned air, and a floor duct, which is mounted in the floor of the vehicle and discharges the air-conditioned air. The vent assembly 20 of the present disclosure, which is disposed in the roof 10, is configured so as to be fluidically connected to the air-conditioning system of the vehicle via the roof duct.

The roof 10 may include a roof panel (not shown) and a roof lining (not shown). The roof duct may be mounted in the roof panel or may be mounted between the roof panel and the roof lining. The roof duct may serve to uniformly distribute air for cooling or heating to the interior of the vehicle.

Further, the air-conditioning system and the roof duct may be configured so as to be fluidically connected to each other via at least one pillar.

Figure 2:
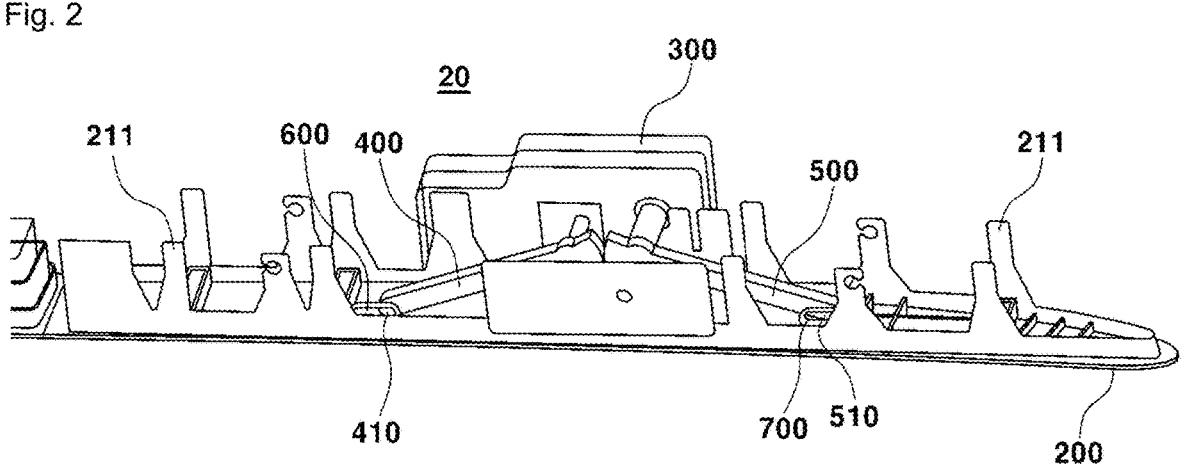
FIG. 2 is a perspective view of a vent assembly of the roof vent according to an embodiment of the present disclosure.

With reference to FIGS. 1 and 2, the vent assembly 20 may include at least one vent unit 200, which is located in the roof 10 and which is configured to enter the roof or to be tilted after entering the roof.

The vent unit 200 of the present disclosure may enter the roof such that it is moved upwards while being maintained in a horizontal state, i.e. parallel to the roof 10 of the vehicle, or may be tilted toward a driver's seat or a passenger seat located in the interior of the vehicle after entering the roof.

The vent unit 200 may allow a large amount of external air (air or wind) to flow into the interior of the vehicle during ventilation. Further, the vent unit 200 may be opened or closed by a passenger who desires air circulation or who desires to change the indoor atmosphere.

In addition, the vent assembly 20 may include a windless unit 21, which is provided between the vent units 200.

The windless unit 21 may include at least one fine hole formed therein. When the vent unit 200 is not being used, the windless unit 21 may generate weak flow of air introduced through the roof duct mounted in the roof 10 and may realize indirect blowing of air to the interior of the vehicle.

Therefore, even when the vent unit 200 is not opened or closed, i.e. does not enter the roof or is not tilted after entering the roof, it is possible to selectively diffuse air introduced from the air-conditioning system to a passenger through the windless unit 21.

The windless unit 21 of the present disclosure may be located between two vent units 200, which are located in the longitudinal direction of the vehicle. Each vent unit 200 may include a plate, and the plate of the vent unit 200 may include a fine hole formed therein, like the windless unit.

Since the plate of the vent unit 200 also includes a fine hole formed therein to generate weak flow of air, the vent unit 200 may realize indirect blowing of air without entering the roof or being tilted.

That is, the vent unit 200 may include at least one fine hole formed therein so as to exhibit the same function as the windless unit 21 even when the vent unit 200 does not enter the roof or is not tilted. Thus, even in the state in which the vent unit 200 does not enter the roof, the vent unit 200 may perform the same function as the windless unit 21 through the vent assembly 20.

FIG. 2 is a view showing the vent assembly of the roof vent shown in FIG. 1.

As shown in the drawing, a driving unit 300 may drive at least one of a first rack unit 400 or a second rack unit 500, which is mounted in the roof 10 or to one side of the vent assembly 20. The driving unit 300 may be implemented as a motor to rotate at least one of the first rack unit 400 or the second rack unit 500.

The first rack unit 400 may be disposed on the back surface of the vent unit 200. One end of the first rack unit 400 may be connected to the driving unit 300 to receive a driving force from the driving unit 300. The first rack unit 400 may be operated to cause the vent unit 200 to enter the roof or to be tilted after entry.

One end of the second rack unit 500 may be connected to the end of the first rack unit 400 so as to interlock with the first rack unit 400. Specifically, the end of the second rack unit 500 may be in contact with the end of the first rack unit 400, which is connected to the driving unit 300, whereby the driving force transmitted to the first rack unit 400 may also be applied to the second rack unit 500 at the same time. Thus, the second rack unit 500 may be operated to cause the vent unit 200 to enter the roof or to be tilted after entry.

In other words, the first rack unit 400 and the second rack unit 500 interlock with each other, i.e. are rotated together by a single driving unit 300. To this end, the end of the first rack unit 400 and the end of the second rack unit 500 that face each other may include gear portions (see FIG. 3) that mesh with each other.

In one embodiment of the present disclosure, any one of the first rack unit 400 or the second rack unit 500 may be connected to one end of the driving unit 300 such that the driving force of the driving unit 300 is applied either to the first rack unit 400 or to the second rack unit 500.

A first slot 600 is formed in one end portion of the vent unit 200. A first projection 410, which is formed at the opposite end of the first rack unit 400, which is located adjacent to the driving unit, is inserted into the first slot 600 so that the opposite end of the first rack unit 400 moves along the first slot 600 in a sliding manner.

The first slot 600 may be formed in a horizontal direction, i.e. parallel to the roof 10, so as to guide the sliding movement of the first projection 410.

A second slot 700 is formed in the opposite end portion of the vent unit 200. A second projection 510, which is formed at the opposite end of the second rack unit 500, is inserted into the second slot 700 so as to slide along the second slot 700 in the horizontal direction when the driving force is applied to the first rack unit 400.

The second slot 700 may be formed in the horizontal direction, i.e. parallel to the roof 10. Thus, when the vent unit 200 enters the roof, the second projection 510 may slide from one inner end of the second slot 700 to the opposite inner end of the second slot 700.

When the vent unit 200 is tilted, the first projection 410 and the second projection 510 may move away from each other. The first slot 600 and the second slot 700 may be formed in the longitudinal direction of the vent unit 200.

In another embodiment of the present disclosure, the opposite end of the first rack unit 400 may have a circular shape. The circular-shaped opposite end of the first rack unit 400 may be engaged with the first slot 600 so as to move along the first recess 600. The opposite end of the second rack unit 500 may also have a circular shape. The circular-shaped opposite end of the second rack unit 500 may be engaged with the second slot 700 so as to move along the second recess 700.

Further, the circular-shaped end of the first rack unit 400 and the circular-shaped end of the second rack unit 500 may be respectively inserted into the first slot 600 and the second slot 700 in an interference-fit manner. Furthermore, the first rack unit 400 and the second rack unit 500 may be configured so as to rotate a predetermined distance in the width direction of the vent unit 200 in order to correspond to the tilting operation of the vent unit 200.

Still further, the first recess 600 and the second recess 700, into which the first rack unit 400 and the second rack unit 500 are respectively inserted, may be formed to have an open top surface so that the first rack unit 400 and the second rack unit 500 move a predetermined distance in the width direction of the vehicle when the vent unit 200 is tilted.

Figure 3:
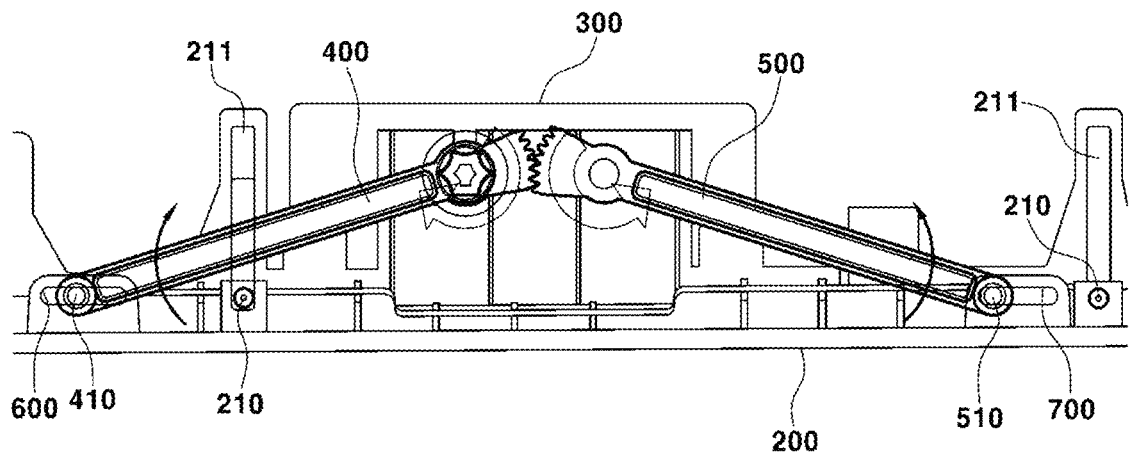
FIG. 3 is a view showing the state in which a vent unit of the vent assembly is entering the roof according to an embodiment of the present disclosure.

As shown in FIGS. 2 and 3, the vent unit 200 may be provided on the back surface thereof with at least one link part 210. The link part 210 may move along a guide slot 211, which is formed in the roof 10 so as to correspond to the link part 210.

When the vent unit 200 enters the roof, the link part 210 may move along the guide slot 211. Further, when the vent unit 200 enters the roof, the link part 210 may serve to restrict movement of the vent unit 200 so as to prevent shaking of the vent unit 200 and maintain and fix the vent unit 200 in a horizontal state.

The guide slot 211 serves to guide the vertical movement of the link part 210. The guide slot 211 includes a first guide 211a and a second guide 211b, which are disposed on both sides of the link part 210 in the width direction of the vent unit 200.

The guide slot 211 further includes a stopper 212, which is formed at the first guide 211a in order to restrict the upward movement of one end of the link part 210 when the link part 210 moves vertically.

In other words, the end of the link part 210 that moves upwards vertically along the first guide 211a comes into contact with the stopper 212 formed at the first guide 211a and is stopped. The opposite end of the link part 210 continuously moves upwards vertically along the second guide 211b, which has no stopper. Thus, the vent unit 200 that has entered the roof is tilted toward the side surface of the roof.

In other words, the vent unit 200 that has entered the roof is tilted in a manner such that one end of the vent unit 200 enters further than the opposite end of the vent unit 200.

Figure 4:
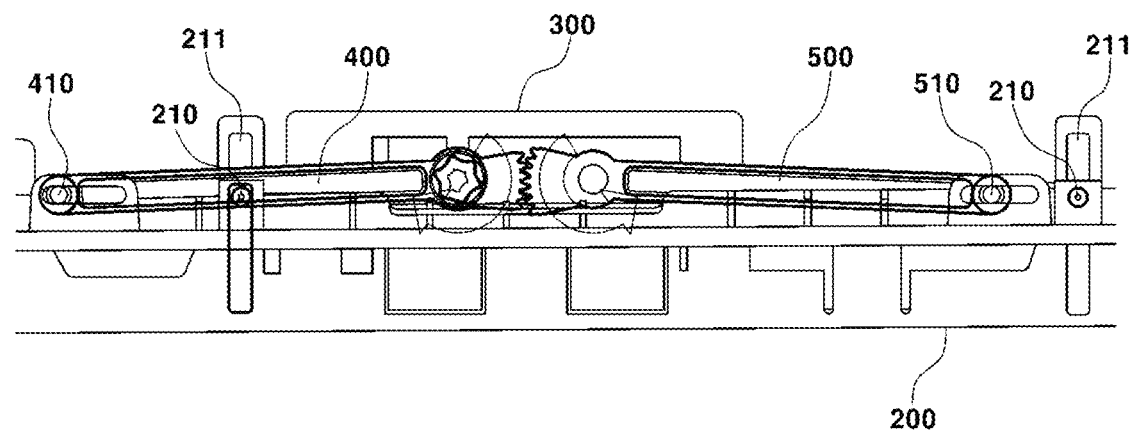
FIG. 4 is a view showing the state in which the vent unit of the vent assembly completely enters the roof according to an embodiment of the present disclosure.

FIGS. 3 and 4 are views showing the state in which the vent unit 200 of the vent assembly enters the roof.

As shown in the drawings, when the vent unit 200 enters the roof, the first rack unit 400 is coupled to the first slot 600. The first projection 410 moves along the first slot 600 in the longitudinal direction of the vent unit 200.

Further, the second projection 510 of the second rack unit 500 moves along the second slot 700 in the direction away from the first projection 410.

Furthermore, when the first projection 410 and the second projection 510 move away from each other, the at least one link part 210 moves along the guide slot 211 in the upward direction of the vehicle. The vent unit 200 enters the roof while being maintained parallel to the roof.

In other words, when the vent unit 200 enters the roof, the first projection 410 of the first rack unit 300 moves along the first slot 600. The second projection 510 of the second rack unit 500 moves along the second slot 700 in the direction away from the first projection 410.

Further, the first projection 410, the second projection 510, and the link part 210 move in an interlocking manner in accordance with the upward vertical movement of the vent unit 200.

As shown in FIG. 4, when the first projection 410 and the second projection 510 are respectively located at the end of the first slot 600 and the end of the second slot 700 that are most distant from each other in the longitudinal direction, the vent unit 200 completely enters the roof.

Further, when the link part 210 moves along the guide slot 211 in the vertical direction of the vehicle, one end of the link part 210 is stopped by the stopper 212 formed at the first guide 211a. This enables the tilting operation of the vent unit 200.

Figure 5:
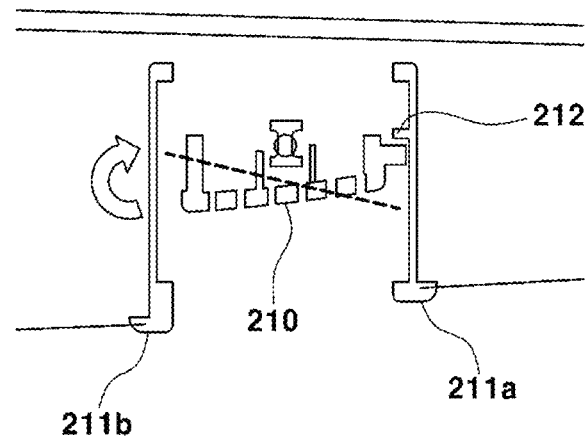
FIG. 5 is a cross-sectional view of the vent unit according to an embodiment of the present disclosure and shows the state in which a link part moves along a guide slot and is tilted.

FIG. 5 shows the coupling relationship between the guide slot 211 and the link part 210 according to an embodiment of the present disclosure.

As shown in the drawing, when the link part 210 moves along the guide slot 211 in the vertical direction of the vehicle, one end of the link part 210, which faces the first guide 211a, is stopped by the stopper 212 formed at the first guide 211a.

On the other hand, the opposite end of the link part 210, which faces the second guide 211b, which has no stopper, moves to the upper end of the guide slot 211. This realizes the tilting operation of the vent unit 200. The tilting angle of the vent unit 200 may be set by the inclination of the link part 210.

Furthermore, at least one link part 210 may include a plurality of link parts 210, which are spaced apart from each other with respect to the driving unit 300 in the longitudinal direction. A plurality of guide slots 211 may be formed so as to correspond to the link parts 210.

The stopper 212 may be disposed in a guide slot 211 that is distant from the center of the interior of the vehicle so that the end of the vent unit 200 that is close to the center of the interior of the vehicle enters the roof further than the opposite end of the vent unit 220. The depth of entry of the end of the vent unit 200 into the roof may vary depending on the setting.

Thus, one end of the vent unit 200, which has a larger depth of entry, receives a large amount of air from the roof duct and a strong wind is discharged through the other end of the vent unit 200, which has a smaller depth of entry. In other words, the intensity of the wind discharged through the end of the vent unit 200 that is located adjacent to the stopper is increased.

In other words, the intensity of the discharged wind and the direction in which the wind is introduced into the interior of the vehicle may vary depending on the angle by which the vent unit 200 is tilted.

In addition, the roof vent may further include a position sensor 900 for detecting the position of a passenger and a controller 1200 for controlling the entry or tilting operation of the vent unit 200 in accordance with the position of the passenger.

Further, according to an embodiment of the present disclosure, the controller 1200 may receive measured temperature values from an external air temperature sensor (not shown) and an indoor temperature sensor (not shown) of the vehicle. The controller 1200 may also perform the entry or tilting operation of the vent unit 200 in accordance with the received temperature values and may control the amount of air that is discharged through the vent unit 200.

Furthermore, according to an embodiment of the present disclosure, the controller 1200 may detect the position of the passenger using the position sensor 900 and may determine whether air-conditioning in the interior of the vehicle is necessary using the external air temperature sensor and the indoor temperature sensor of the vehicle. In other words, the controller 1200 may receive the measured values and may control the operation of the vent unit 200 based on the received measured values.

In addition, the controller 1200 may include an illumination unit (not shown), which includes a brightness sensor (not shown) for sensing the brightness in the interior of the vehicle when a passenger rides in the vehicle and which includes an illumination sensor (not shown) for turning light on/off in accordance with the brightness.

The position sensor 900 may be mounted in a seat to detect the position of a passenger. When a passenger sits on the seat, the controller 1200 may determine whether to perform the entry operation or the tilting operation of the vent unit 200 in accordance with the sitting position of the passenger.

In other words, the controller 1200 may control the operation of the vent unit 200 in consideration of factors, such as the indoor temperature of the vehicle, the outdoor temperature, and a user's request.

When the vent unit 200 enters the roof, the vent unit 200 may cause air to be uniformly introduced into the interior of the vehicle in accordance with a user's request irrespective of the sitting position of a passenger. Further, when the vent unit 200 is tilted after entering the roof, the vent unit 200 may cause a larger amount of air to flow to a selected region than to other regions in accordance with the sitting position of the passenger.

The controller 1200 may perform control such that the vent unit 200 enters the roof in order to uniformly introduce air into the interior of the vehicle through the vent unit 200 and such that the vent unit 200 is tilted after entry in order to cause a larger amount of air to flow to a selected region in accordance with the position of the user or a user's request.

In order to increase the amount of air discharged so as to realize the intensive flow of air to a selected region, the stopper 212 of the present disclosure is disposed on the side surface of the guide slot 211 that is close to the region to which air intensively flows.

Thus, the end of the vent unit 200 that has a smaller depth of entry is disposed close to the region to which air intensively flows. The end of the vent unit 200 that has a larger depth of entry is disposed distant from the corresponding region. As a result, the intensity of wind that is discharged to a region located close to the end of the vent unit 200 that has a smaller depth of entry may increase.

Further, according to an embodiment of the present disclosure, since the controller 1200 includes the roof vent and the illumination unit, which interlock with the position sensor 900, the controller 1200 may perform control so as to turn on the light in the region in which a passenger is present and to cause the opposite end of the vent unit 200 that faces the passenger to further enter the roof.

Figure 6:
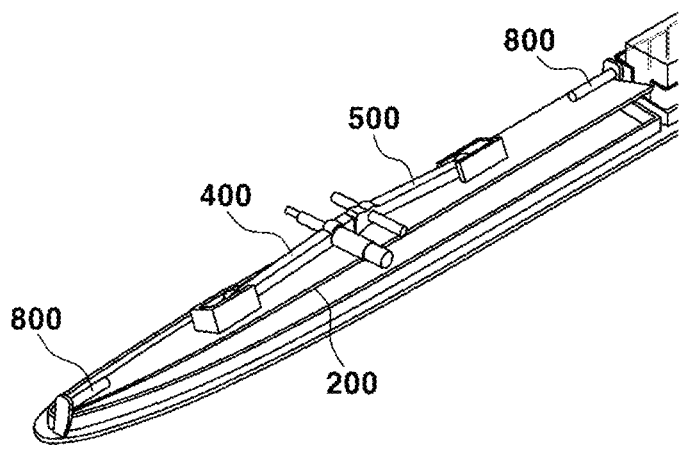
FIG. 6 is a view of a roof vent according to another embodiment of the present disclosure and includes a fixing part for tilting one side of a vent unit.

FIG. 6 is a view showing a roof vent according to another embodiment of the present disclosure. A vent unit 200 is tilted after entering the roof using at least one fixing part, which is disposed so as to be offset from the central axis in the longitudinal direction of the vent unit 200.

The at least one fixing part may include a plurality of fixing parts 800, which are disposed so as to be offset from the central axis in the longitudinal direction of the vent unit 200.

The fixing part 800 may be offset from the central axis in the longitudinal direction of the vent unit 200 and may be spaced apart from the surface of the roof by a predetermined distance in the height direction of the vehicle. Thus, the vent unit 200 enters the roof after moving the predetermined distance. The side of the vent unit 200 that is located opposite the fixing part 800 (i.e. the side of the vent unit 200 at which the fixing part is not located) enters the roof further than the opposite side of the vent unit 200.

The roof vent may further include a first slot 600 and a second slot 700, which are formed in the back surface of the vent unit 200, and a first rack unit 400 and a second rack unit 500, which are respectively engaged with the first slot 600 and the second slot 700. The end of the first rack unit 400 and the end of the second rack unit 500, which are respectively engaged with the first slot 600 and the second slot 700, may be formed so as to have a circular-shaped cross-section.

Thus, when the vent unit 200 is tilted by the fixing part 800, the circular-shaped ends of the rack units 400 and 500, which are engaged with the corresponding slots 600 and 700, may move a predetermined distance in the width direction of the vent unit 200.

In other words, the upward movement of one side of the vent unit 200 in the width direction thereof is restricted to a predetermined extent by the fixing part 800. The opposite side of the vent unit 200 in the width direction thereof is allowed to move further upwards. Thus, the circular-shaped ends of the rack units 400 and 500 may rotate without interfering with the slots 600 and 700 in the width direction in accordance with the inclination of the vent unit 200.

The depth of entry of one side of the vent unit 200 is restricted by the fixing part. The depth of entry of the opposite side of the vent unit 200 is greater than that of the one side of the vent unit 200, whereby the vent unit 200 is tilted in the width direction of the vehicle.

Figure 7:
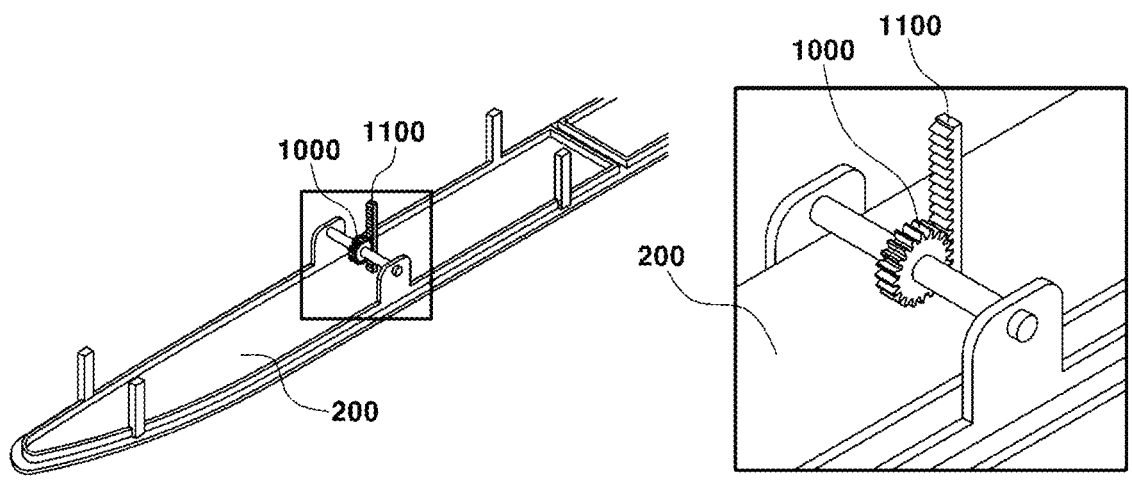
FIG. 7 is a view of a roof vent according to a further embodiment of the present disclosure and includes a rotary gear and a rack gear for moving a vent unit.

FIG. 7 is a view showing a roof vent according to a further embodiment of the present disclosure. A rotary gear 1000 is provided as a driving unit and a rack gear 1100 is secured to the back surface of a vent unit 200 in order to convert the rotary force of the driving unit into a vertical driving force.

As shown in the drawing, the rack gear 1100 is secured to the back surface of the vent unit 200 and extends in the direction perpendicular to the roof. The rack gear 1100 meshes with the rotary gear 1000, which is configured to be rotated by the driving unit.

The rotary gear 1000 serves to cause the vent unit 200 to enter the roof in response to a user's request.

In addition, the roof vent may further include at least one link part 210, which is disposed in the longitudinal direction of the vent unit 200 and is secured to the back surface of the vent unit 200. The roof vent may also include guide grooves 211, which are formed in both side surfaces of the vent assembly in order to receive at least a portion of the link part 210.

When the vent unit 200 enters the roof, the link part 210 may move simultaneously therewith and the guide grooves 211 may serve to guide the upward movement of the link part 210.

The roof vent may further include a stopper 212, which is formed at one of the guide grooves 211. Thus, when the vent unit 200 enters the roof, the side of the vent unit 200 that is adjacent to the stopper 212 is tilted in the downward direction of the vehicle. As a result, the vent unit 200 is tilted in the width direction of the vehicle.

According to still another embodiment of the present disclosure, the roof vent may further include a fixing part 800, which is disposed on at least one end in the longitudinal direction of the vent unit 200 and is disposed so as to be offset from the central axis in the longitudinal direction of the vent unit 200. Thus, the side of the vent unit 200 that is adjacent to the fixing part 800 may be tilted further downwards than the opposite side of the vent unit 200.

As is apparent from the above description, the present disclosure provides a roof vent that is capable of adjusting an airflow direction so that air is introduced, not only into a region corresponding to the mounting position of the roof vent, but also into a region distant from the mounting position of the roof vent. This selectively enables uniform introduction of air into the interior of the vehicle or concentration of airflow in a desired direction.

In addition, since the roof vent is configured to be tilted, it is possible to allow air to flow to a selected position or to a selected passenger.

In addition, since the roof vent is configured to perform an entry or tilting operation in the interior of the vehicle, it is possible to introduce a larger amount of air into the interior of the vehicle than a roof vent configured to perform an entry or tilting operation outside the vehicle.

The above description is illustrative of the present disclosure. Further, the above disclosure is intended to illustrate and explain the embodiments of the present disclosure. The present disclosure may be used in various other combinations, so modifications, and environments. In other words, the present disclosure may be changed or modified within the scope of the concept of the embodiments disclosed herein, within the equivalent scope of the disclosure, and/or within the skill and knowledge of the art. The described embodiments illustrate the best state of the art to implement the technical idea of the present disclosure. Various changes may be made thereto as demanded for specific applications and uses of the present disclosure. Accordingly, the above description is not intended to limit the present disclosure to the embodiments. Further, the appended claims should be construed as encompassing such other embodiments.

What is claimed is:

1. A vent comprising:
a roof disposed at an upper side of an interior of a vehicle; and
a vent assembly, the vent assembly including,
at least one vent unit configured to retract into the roof,
a driving unit operating the vent unit, and
a first rack unit having a first arcuate gear portion at a free end thereof, the first rack unit applying a driving force of the driving unit to the vent unit,
wherein a second rack unit has a second arcuate gear portion at a free end thereof that faces and interlocks with the first arcuate gear portion, and
wherein the vent unit retracts into the roof due to operation of the driving unit.

2. The vent of claim 1, further comprising:
a first slot formed in a back surface of the vent unit to allow one end of the first rack unit to move to one end of the vent unit in a longitudinal direction thereof; and
a second slot formed in the back surface of the vent unit to allow one end of the second rack unit to move to an opposite end of the vent unit in the longitudinal direction thereof,
wherein the vent unit retracts into the roof due to operation of the first rack unit.

3. The vent of claim 1,
wherein the at least one vent unit comprises a plurality of vent units,
wherein the vent assembly further comprises a diffuse vent disposed between the vent units, and
wherein the plurality of vent units and the diffuse vent are arranged in a longitudinal direction of the vehicle.

4. The vent of claim 1,
wherein the at least one vent unit comprises a plurality of vent units,
wherein the vent assembly further comprises a diffuse vent disposed between the vent units, and
wherein the plurality of vent units and the diffuse vent are formed symmetrically in a width direction of the vehicle.

5. The vent of claim 2, further comprising:
a link part formed on a back surface of the vent unit; and
a guide slot formed in the roof to guide movement of the link part when the vent unit retracts into the roof.

6. The vent of claim 5, wherein the guide slot comprises:
a first guide and a second guide disposed so as to face the link part; and
a stopper formed at the first guide,
wherein the vent unit is tilted such that a depth of entry of one end of the link part that moves along the first guide is smaller than a depth of entry of an opposite end of the link part that moves along the second guide.

7. The vent of claim 1, further comprising:
a position sensor detecting a position of a passenger; and
a controller configured to control operation of the driving unit so as to realize an entry or tilting operation of the vent unit in accordance with the detected position of the passenger.

8. The vent of claim 2, wherein one end of the first rack unit and one end of the second rack unit that face the vent unit are formed in a circular shape, and
wherein the one end of the first rack unit and the one end of the second rack unit are respectively engaged with the first slot and the second slot.

9. The vent of claim 8, wherein the first slot and the second slot are disposed in a longitudinal direction of the vent unit, and
wherein the first rack unit and the second rack unit extend along the vent unit in the longitudinal direction thereof.

* * * * *